Jan. 7, 1941.　　　A. G. GURRIES　　　2,227,450
APRON CONTROL FOR CARRYING SCRAPERS
Filed Aug. 24, 1938　　　3 Sheets-Sheet 1

INVENTOR
A. G. Gurries
BY
ATTORNEY

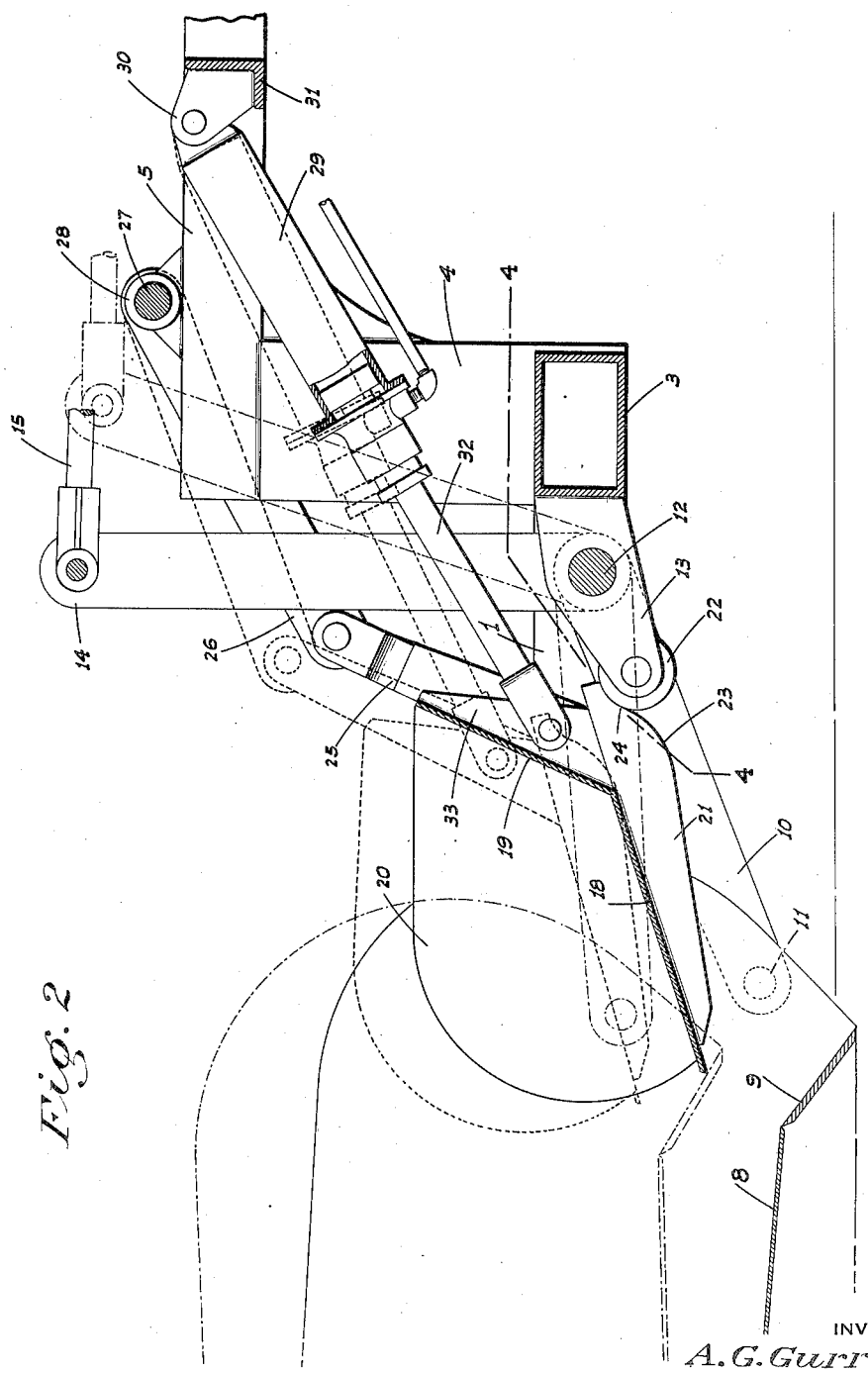

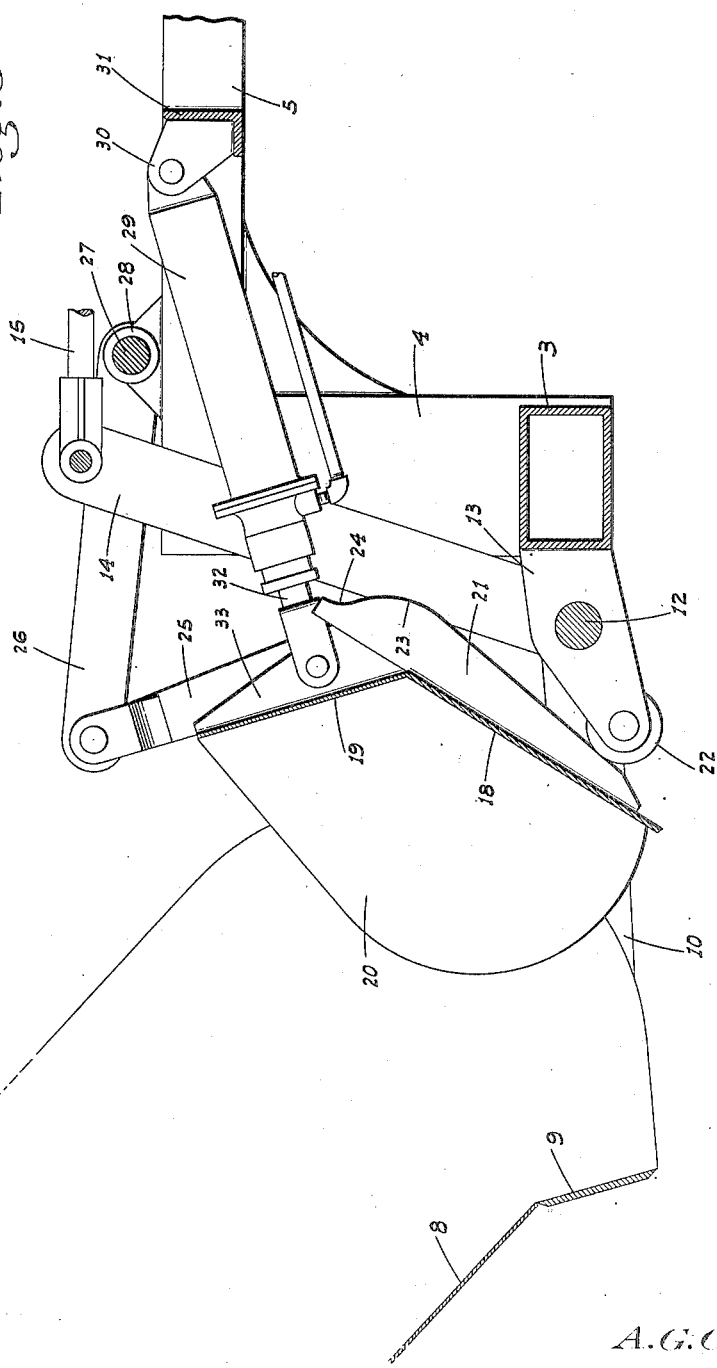

Patented Jan. 7, 1941

2,227,450

UNITED STATES PATENT OFFICE 2,227,450

APRON CONTROL FOR CARRYING SCRAPERS

Albert G. Gurries, Gilroy, Calif., assignor to "Be-Ge" Manufacturing and Welding Works, Gilroy, Calif., a copartnership composed of Albert G. Gurries and James A. Bussert Application August 24, 1938, Serial No. 226,501

13 Claims. (Cl. 37—126)

This invention relates to heavy duty carrying scrapers, and represents improvements and modifications of the scraper shown in my copending application for Patent, Serial No. 222,622, filed August 2, 1938, particularly with respect to the apron mounting and control or operating means therefor.

One object of the present invention is to so mount and control the operation of the apron that not only may it be moved when loaded to a discharge position with a smaller expenditure of power than was previously necessary, but no part of the mounting and operating means overhangs the apron or scraper bowl to interfere with shovel loading of the same if it should be desired to use the structure as a dirt carrying and dumping vehicle rather than as a scraper.

A further object is to mount the apron so that in the event of the apron, while in lowered position, encountering and passing over a relatively large and unyielding obstruction, the apron can yield upwardly without affecting the power control mechanism and without damaging the apron.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is an enlarged fragmentary longitudinal section showing the apron in its normal or dirt receiving position.

Figure 3 is a similar view showing the apron in a dumping position.

Figure 1:
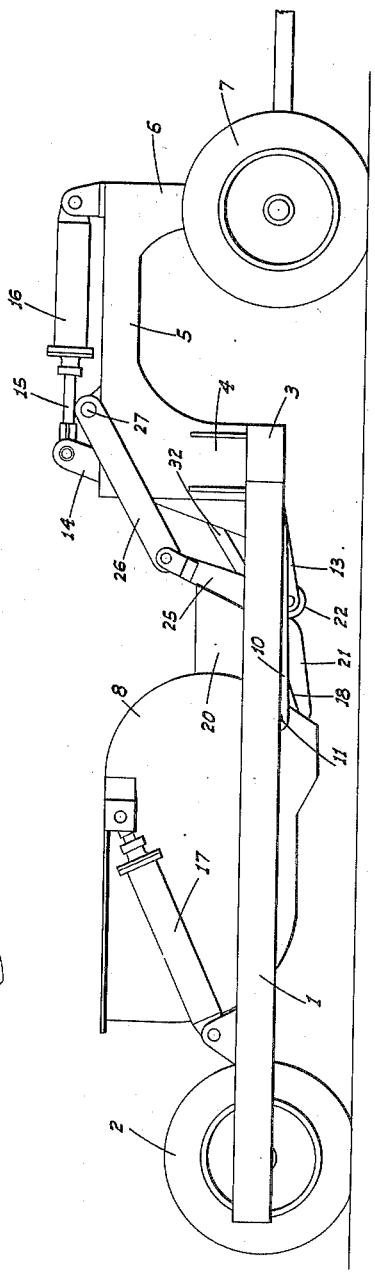
Figure 1 is a side elevation of my carrying scraper and improved apron structure.
Figure 4:
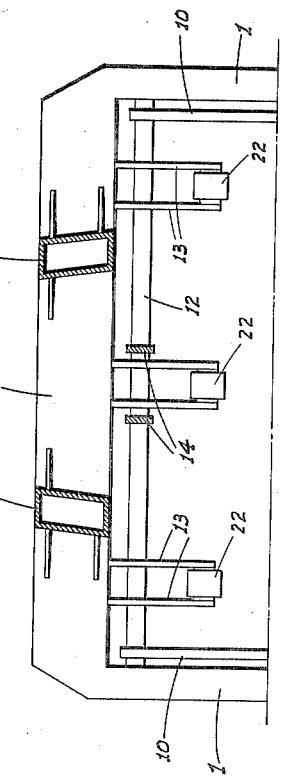
Figure 4 is a fragmentary plan section of the frame on line 4—4 of Fig. 2.

Referring now more particularly to the characters of reference on the drawings, the frame of the scraper is substantially identical with that described in said copending application. It comprises side beams 1 supported by wheels 2 at the rear end. At their forward end, beams 1 are connected by a transverse beam 3 on the same level, which supports uprights 4, spaced apart a lesser distance than beams 1. Relatively short beams 5 extend forwardly in converging relation from uprights 4 and at their forward end support a depending post 6 on which the front swivel wheel truck 7 is mounted.

Disposed between wheels 2 and crossbeam 3 is the scraper bowl 8, having a downwardly sloping scraping blade 9 across its forward end.

A short distance above the blade forwardly extending tension arms 10 are pivoted on the sides of the bowl as at 11. These arms are disposed between the sides of the bowl and the side beams 1 and at their forward end are secured on a cross shaft 12 disposed rearwardly of crossbeam 3 and journaled in bracket plates 13 fixed on the back side of and projecting rearwardly from said beam.

Another pair of arms 14, spaced relatively close, project upward from shaft 12 and at their upper end, which is at a level above beams 5, are connected to the piston rod 15 of a hydraulic cylinder 16 which is swivelly mounted at its forward end on top of beams 5 adjacent their forward end. Thus far, as will be evident, the structure is substantially the same as that of my copending application, and the level of the blade is governed by the raising and lowering of arms 10, which is controlled by the hydraulic cylinder 16. Swinging of the bowl about pivots 11 to a dumping position is effected by hydraulic units 17 one on each side of the bowl toward the back.

The apron and its mounting, which form the subject of this invention, will now be described.

The apron comprises a bottom plate 18, an upstanding front or end plate 19, and sides 20 overlapping the bowl sides inwardly thereof. Rails 21 are fixed on and extend under the bottom plate 18 and ride on rollers 22 supported from plates 13 rearwardly of shaft 12. The roller engaging edge of each rail is disposed with a slight downward slope from its rear end relative to plate 18, and at its forward end is formed with an abrupt convex curvature 23, followed by a short convex curvature 24 of the same radius as rollers 22; the forward end of the rails being somewhat ahead of the apron.

Projecting upwardly from immediately in front of apron plate 19 and rigid therewith are arms 25, on the upper end of which are pivoted the rear end of links 26. These links extend forwardly on the outside of uprights 4 and at their forward end are fixed on a cross shaft 27 disposed under piston rod 15 and journaled in bearings 28 supported by and on top of beams 5.

A hydraulic cylinder 29, disposed in a transverse plane between arms 14, is pivoted at its forward end on a bracket 30 carried by a cross member 31 extending between beams 5 some distance ahead of shaft 27.

A piston rod 32 projects from the rear end of cylinder 29 and is operatively connected to a rib 33 rigid with and in front of the apron and at such a point thereon that the cylinder and links 26 are substantially parallel with each other.

The arrangement of the apron and its connected parts is such that when the apron is in its normal dirt receiving position, the rear end of the bottom plate 18 is disposed with a downward slant and is in position to overlap the bowl blade 9, the concave portions of rails 21 are riding on the rollers 22, the piston rod 32 is fully extended, and the cylinder and links 26 are disposed with a downward slope to the rear, all as shown in Fig. 2.

With this arrangement, the apron can freely lift, as indicated in dotted lines, without straining or warping any part. When it is desired to raise the apron to a dumping position, fluid is fed into cylinder 29 to retract the piston rod 32. This causes the apron to swing about the pivot connection of links 26 with arms 25, and the apron immediately assumes a relatively steep slope as the abrupt curvature 23 of the rails rides up the rollers. The dirt thus immediately begins to slide from the apron, and as the piston rod continues to pull on the apron, the links and cylinder swing upwardly until the apron finally assumes a position with the bottom plate nearly vertical and the rollers engaging the rails near their rear end as shown in Fig. 3.

As the apron lifts, the initial parallel relationship of the links and cylinder no longer obtains, but such relationship is only important when the apron is in a lowered and dirt receiving position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a scraper having a frame and a bowl, a front dirt-carrying apron for the bowl, a link extending forwardly from the top of the apron and pivoted at its ends on the apron and frame, a member mounted on the frame and on which the apron rests, and push-and-pull means applied to the apron below the link and arranged for operation lengthwise of the scraper.

2. In a scraper having a frame and a bowl, a front dirt-carrying apron for the bowl, a link extending forwardly from the top of the apron and pivoted at its ends on the apron and frame, a member mounted on the frame and on which the apron rests, a hydraulic cylinder pivoted at its forward end on the frame ahead of the apron and a piston rod projecting from the cylinder and pivoted on the front of the apron below the link.

3. A structure as in claim 2 in which the cylinder and rod unit, and the link, are substantially parallel to each other when the apron is in its lowermost and rearmost position.

4. In a scraper: a wheeled frame; an earth receiving bowl having a blade, said bowl having a lowered digging position and a raised carrying position; a cross shaft rotatably supported by said frame forwardly of said bowl; arms secured to said shaft and extending rearwardly and being pivotally connected to said bowl above said blade; links pivotally connected to said frame rearwardly of said bowl and extending forwardly from said rear pivots; pivot means on the sides of said bowl near its upper part and near the vertical center line thereof for connecting said links to said bowl, said arms extending rearwardly and downwardly and said links extending forwardly and upwardly when said bowl is in digging position; and means for rotating said cross shaft for raising and lowering said arms, said bowl thereby being bodily raised and lowered without substantial tilting.

5. A structure as in claim 4, in which said links comprise extensible units; said units normally being contracted.

6. In a scraper: a wheeled frame; an earth receiving bowl having a blade, said bowl having a lowered digging position and a raised carrying position; a cross shaft rotatably supported by said frame forwardly of said bowl; arms secured to said shaft and extending rearwardly and being pivotally connected to said bowl above said blade; links pivotally connected to said frame rearwardly of said bowl and extending forwardly from said rear pivots; pivot means on the sides of said bowl near its upper part and near the vertical center line thereof for connecting said links to said bowl, the horizontal distance between said pivot means and the axes where said arms are pivotally connected to said bowl being substantially one-half of the distance between said pivot means and the back of said bowl, said arms extending rearwardly and downwardly and said links extending forwardly and upwardly and said arms and said links being substantially parallel to each other when said bowl is in digging position; and means for rotating said cross shaft for raising and lowering said arms, said bowl thereby being bodily raised and lowered without substantial tilting.

7. In a scraper, a frame, a bowl supported by said frame, an apron, link means connected to said apron and to said frame, means for moving said apron relative to said frame, and cam means below and supporting said apron and including separable parts, a part of which is on said frame and a part of which is on said apron.

8. In a scraper, a frame, a bowl supported by said frame, an apron, means connected to said apron and pivotally connected to said frame for moving said apron relative to said frame, guide means connected to said frame and the upper part of said apron, and cam means connected between said frame and the lower part of said apron.

9. In a scraper, a wheel mounted frame, a bowl supported by the frame, an apron to cooperate with the bowl at the front, link means connecting the frame and apron to allow of guided vertical movement of the latter, means for moving the apron relative to the frame, and cam means below and supporting the apron and including separate cooperating parts arranged for unrestrained relative vertical separation; one part being secured on the frame and the other part being on the apron.

10. In a scraper having a frame and a bowl, a front dirt-carrying apron for the bowl, a link extending forwardly from the top of the apron and pivoted at its ends on the apron and frame, a member mounted on the frame and on which the apron rests, and push-and-pull means applied to the apron below the link and arranged for operation lengthwise of the scraper; said member being a roller.

11. In a scraper having a frame and a bowl, a front dirt-carrying apron for the bowl, a link extending forwardly from the top of the apron and pivoted at its ends on the apron and frame, a roller associated with the frame, a track on and under the apron engaging the roller, the track adjacent its forward end engaging the roller when the apron is in its lowermost and rearmost position, and push-and-pull means applied to the apron below the link and arranged for operation lengthwise of the scraper.

12. A structure as in claim 11 in which said track is formed with a relatively abrupt drop immediately rearward of its forward end.

13. In a scraper having a frame and a bowl, a front dirt-retaining apron for the bowl, means flexibly connecting the frame and apron for vertical and swinging movement of the latter, a member mounted on the frame and on which the apron normally rests, and power means applied to the apron to swing the same relative to the frame; said member being a roller.

ALBERT G. GURRIES.